UNITED STATES PATENT OFFICE.

ERNEST D. REED, OF ANN ARBOR, MICHIGAN, ASSIGNOR TO ROYAL S. COPELAND, TRUSTEE, OF ANN ARBOR, MICHIGAN.

ARTIFICIAL STONE.

SPECIFICATION forming part of Letters Patent No. 773,421, dated October 25, 1904.

Application filed March 21, 1904. Serial No. 199,200. (No specimens.)

*To all whom it may concern:*

Be it known that I, ERNEST D. REED, a citizen of the United States, residing at Ann Arbor, in the county of Washtenaw and State of Michigan, have invented certain new and useful Improvements in Artificial Stone, of which the following is a specification.

The invention consists in a new composition of matter for artificial stone and in the process of making the same, as hereinafter described.

In carrying out the process I employ as the base of the composition sand, cement, and lime in the proportions of about one to ten parts of sand, one part of cement, and one part lime. These ingredients are thoroughly mixed in any suitable manner in their dry state and then moistened with a liquid mixture hereinafter described to form a plastic mass, which may be molded into the article or articles desired. The moistening mixture is formed by dissolving in about forty gallons of water copperas, copper sulfate, chromic alum, manganese chlorid litharge, and potassium carbonate and adding to this solution sodium silicate. The proportions of these metals may be varied within certain limits; but I have found that the best results are obtained by using with the amount of water specified about two pounds of copperas, one pound of copper sulfate, one pound each of chromic alum, manganese chlorid, litharge, and potassium carbonate, and about fifteen pounds of the silicate. The metals form insoluble silicates by uniting with the sodium silicate and serve to cement the sand particles. Furthermore, by using a large number and variety of metals, as set forth, a corresponding number and variety of insoluble silicates are produced, which add materially to the tensile strength and durability of the product. To the liquid mixture thus formed is added enough of a mixture of potassium bichromate and sulfuric acid to neutralize the alkali. This has the effect of hastening the maturing of the product by a strong oxidizing agent and liberates silicic acid, which combines with the bases present in the dry mixture and further assists in cementing the particles. Calcium fluorid and sulfuric acid in the proportions of about one-fourth pound of the former to about three-tenths of a pound of the acid are then added to the neutralized mixture, the hydrofluoric acid liberated by the reaction acting upon the sand, causing it to enter into chemical combination with the bases present in the two mixtures.

The mixed sand, cement, and lime is thoroughly moistened with the liquid mixture described until a plastic mass is produced, which is molded, as previously described, and allowed to stand and set.

I may and preferably do subject the composition while curing to a wash or bath for the purpose of hardening the compound. This wash is composed of about ten pounds of hydrofluo-silicic acid, about four pounds of acetic acid, and approximately twenty-five gallons of water.

The compound while in the plastic state is sprinkled or moistened at intervals of eighteen to twenty-four hours for a period ranging from three to six or seven days with the wash described, which fixes the bases present in the pores of the compound and gives a waterproof finish to the product.

What I claim as my invention is—

1. The herein-described composition of matter consisting of sand, cement and lime moistened with a neutralized mixture of water, copperas, copper sulfate, chromic alum, manganese chlorid, litharge, potassium carbonate, sodium silicate, calcium fluorid and sulfuric acid.

2. The herein-described composition of matter consisting of sand, cement and lime moistened with a neutralized mixture of water, copperas, copper sulfate, chromic alum, manganese chlorid, litharge, potassium carbonate, sodium silicate, calcium fluorid and sulfuric acid, the composition while curing being washed with an acetic-acid solution containing hydrofluo-silicic acid.

3. The herein-described process of making artificial stone which consists in mixing sand, cement and lime while in the dry state, in mixing together water, copperas, copper sulfate, chromic alum, manganese chlorid, litharge, potassium carbonate and sodium silicate in substantially the proportions specified, in neutralizing the liquid mixture with an acidifying agent, in then adding to the neutralized mixture calcium fluorid and sulfuric acid, and finally mingling the dry and liquid mixtures in proportions to produce a plastic mass.

4. The herein-described process of making artificial stone consisting in mixing sand, cement and lime while in the dry state, in mixing together water, copperas, copper sulfate, chromic alum, manganese chlorid, litharge, potassium carbonate and sodium silicate in the proportions specified, in neutralizing said liquid mixture with a mixture of sulfuric acid and potassium bichromate, in then adding to the neutralized mixture calcium fluorid and sulfuric acid, then mingling the dry and liquid mixtures to produce a plastic mass, and finally treating at intervals the plastic compound thus formed with an acetic-acid solution containing hydrofluo-silicic acid.

In testimony whereof I affix my signature in presence of two witnesses.

ERNEST D. REED.

Witnesses:
   JAS. P. BARRY,
   H. C. SMITH.